UNITED STATES PATENT OFFICE.

FRANCIS I. DU PONT, OF WILMINGTON, DELAWARE.

GUNPOWDER AND PROCESS OF MAKING SAME.

No. 813,020.  Specification of Letters Patent.  Patented Feb. 20, 1906.

Application filed August 3, 1904. Serial No. 219,258.

*To all whom it may concern:*

Be it known that I, FRANCIS I. DU PONT, a citizen of the United States, residing at Wilmington, county of Newcastle, and State of Delaware, have invented a new and useful Improvement in Gunpowder, of which the following is a full, clear, and exact description.

My invention consists in a new gunpowder and method of making the same, the object being to produce a powder which may be readily molded into grains or other desired forms.

In making my new gunpowder I substitute starch for a portion of the charcoal of the powder. I admix saltpeter, sulfur, charcoal, and starch, and any other desired ingredient, the starch being of any desired per cent. of the total. I prefer to use starch in about seven to eight per cent. of the total ingredients. I have made this compound containing seven per cent. (7%) of starch, seventy-four per cent. (74%) of saltpeter, eight per cent. (8%) of sulfur, and eleven per cent. (11%) of charcoal. After this admixture is made I add water, preferably from five to fifteen per cent., and mix this with the materials. I then subject this last admixture to a temperature of 50° to 100° centigrade for a time sufficient for the heat to penetrate through the mass. The effect of the heat upon this admixture is to swell the starch-granules and make a paste out of the starch with the water which has been added to the mass. I then press the material into grains or other desired form, which may be done very easily owing to the plastic condition. I then dry the grains or other form in which the gunpowder now is.

Having now fully described my invention, what I claim, and desire to protect by Letters Patent, is—

1. The hereinbefore-described process of making gunpowder, adapted to be molded into grains or other desired forms, which consists in forming a gunpowder, containing starch, mixing water therewith, then subjecting the admixture to the action of heat sufficient to swell the starch-granules, and then forming the powder into grains or other desired forms.

2. The hereinbefore-described process of making gunpowder, adapted to be molded into grains or other desired forms, which consists in forming a powder, containing starch, in the proportion of seven to eight per cent. of the total ingredients, then adding an amount of water from five to fifteen per cent. and mixing the same, then subjecting the mixture to the action of heat sufficient to swell the starch-granules, then pressing the material into grains or other desired forms.

3. A new gunpowder containing starch and water, the starch-granules being swelled by heat.

4. The hereinbefore-described process of making gunpowder, containing starch, which consists in subjecting said powder, with the starch in a moist condition, to the action of heat sufficient to swell the starch-granules.

In testimony of which invention I have hereunto set my hand, at Wilmington, on this 1st day of August, 1904.

FRANCIS I. DU PONT.

Witnesses:
 IRVING EYER,
 WM. P. DWINNELL.